3,214,376
LUBRICATING GREASE COMPOSITIONS
Arnold J. Morway, Clark, N.J., assignor to Esso Research and Engineering Company, a corporation of Delaware
No Drawing. Filed Jan. 7, 1963, Ser. No. 249,583
8 Claims. (Cl. 252—18)

This invention relates to lubricating grease compositions, their use and preparation, which compositions contain an amino alkyl phenol or a metal salt thereof. Particularly, the invention relates to lubricating grease compositions comprising lubricating oil containing metal salt of carboxylic acid and amino alkyl phenols or their salt derivatives.

A property of certain normally solid greases is the ability to shear-harden when subjected to shearing stresses. The ability to shear-harden is of particular importance in the lubrication of anti-friction ball bearings since a non-hardening type grease tends to churn in the rotating bearing, thereby imparting resistance to the rotation of the bearing, which in turn increases friction and generates unwanted heat. The use of a shear-hardening grease results in the formation of a channel through the grease formed by the rotating ball bearings so that the grease does not impede the ball bearing movement, thereby giving lower torque requirements, less friction, and a cooler-running bearing.

However, in the lubrication of roller bearings, which are generally of larger size than ball bearings, the utilization of a shear-hardening grease is contraindicated since the turning roller bearings tend to push the grease out of the way of the rollers, thereby causing lubrication starvation, possible early failure of the bearings, and high heat generation. Moreover, if the greases are high melting greases (e.g. greater than 500° F. melting point), sufficient heat may not be generated to cause the grease to soften and run or drop back into the bearings due to vibrations, etc. Therefore, it may be seen that while a channeling shear-hardening grease is desirable for ball bearing lubrication, a non-channeling or semi-channeling soft grease is desirable for the lubrication of roller bearings.

Accordingly, it has been found and forms the subject of the present invention, that the inclusion of an amino nonyl phenol or metal salt thereof will impart a high degree of plasticization to greases thickened with conventional soap thickeners, without causing loss of their excellent lubricating properties, structural stability or fluidation. At the same time, it has been discovered that the amino alkyl phenol material will additionally impart antioxidant properties to the grease, thereby enabling conventional antioxidants to be either reduced in quantity or eliminated.

The alkyl amino phenols contemplated for use in the present invention are known in the prior art. For example, U.S. Patents 2,353,491; 2,459,112; and 3,036,003 all disclose the use of alkyl amino phenols or their metal salts in liquid lubricating compositions. However, the prior art has not recognized that these materials may be beneficially utilized in lubricating grease compositions. By the term "grease" is meant a lubricating composition which has been thickened to grease consistency and is normally solid at room temperature. Moreover, the prior art has not recognized that these alkyl amino phenol materials are capable of imparting a degree of plasticization to greases without causing loss of structural stability, as well as imparting antioxidant properties.

The amino alkyl phenols and metal salts thereof are generally prepared by reacting an aldehyde, an alkylene polyamine, and phenol or alkyl phenol in the presence of a mineral oil diluent. The resulting condensation product can then be reacted with a desired metal base, e.g. an alkaline earth metal base, to form the salt derivative. Both the amino alkyl phenol per se and the salt derivative thereof are contemplated for use in the present invention. Generally, the reactants will be utilized in a ratio of about 0.5 to 2 moles of the aldehyde and the alkyl phenol for each nitrogen atom present in the polyamine. Whereas aldehydes in general are contemplated, preferred aldehydes will be the $C_1$ to $C_{12}$ aliphatic aldehydes, such as formaldehyde, acetaldehyde, propionaldehyde, etc., with formaldehyde being especially preferred.

The alkylene polyamines suitable in the invention may be characterized by the general formula:

$$H(HN\!-\!R)_nNH_2$$

wherein R is a substituted or unsubstituted $C_2$ to $C_6$ alkylene radical and $n$ is an integer from 1 to 10. By "alkylene" radical is meant a covalent radical such as —$CH_2CH_2$—. Representative polyamines within the above formula include diethylenetriamine, tetraethylenepentamine, ethylene diamine, propylene diamine, etc. Preferred polyamines are the alkylene diamines, with ethylene diamine being particularly preferred.

The alkyl phenols are typified by at least one phenol nucleus, substituted or unsubstituted, having at least one alkyl group of about 5 to 25, preferably 6 to 12, carbon atoms attached thereto. Examples of such compounds will include nonyl phenol, isooctyl phenol, diamyl phenol, dilauryl phenol, and the like.

A typical reaction procedure involves adding the aldehyde compound to a mineral oil solution of the alkyl phenol and the polyamine. The resulting mixture is heated to a temperature within the range of 180 to 210° F. and maintained at said temperature for about 1 to 8 hours. Upon completion of the reaction, an alkali or alkaline earth metal base, e.g. a hydroxide, may be subsequently added to convert to the desired metal salt. The reaction mixture is then heated to an elevated temperature, e.g. 320° F., while being stripped with nitrogen to remove any water which may be present, as for example, where the aldehyde is added as a water solution.

Other solvents, e.g. methanol, ethanol, isopropanol, benzene, toluene, xylene, etc., can be readily utilized as the reaction diluent in place of the aforementioned mineral oil. Utilization of mineral oil is advantageous, however, since it eliminates the necessity of solvent stripping and final oil addition to form the additive concentrate.

The reaction time, temperature, and relative mole ratios of the reactants may be readily varied to form a variety of similar compounds. For example, a preferred form of compound, which is believed to have the approximate general formula:

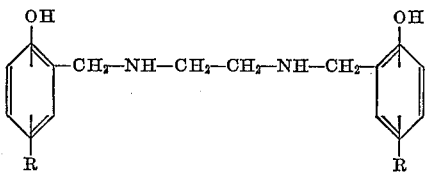

is prepared by reacting formaldehyde, an alkyl phenol, and ethylene diamine in the relative mole ratios of a moles of both the alkyl phenol and the aldehyde for each mole of the polyamine. An increase in this ratio will produce a mixture of compounds of varying degrees of hydrogen substitution on the amino groups. Thus, a utilization of the reactants in a ratio of 4 moles of both the alkyl phenol and aldehyde for each mole of the polyamine will produce a reaction mixture which is believed to predominantly contain a final product having the approximate general formula:

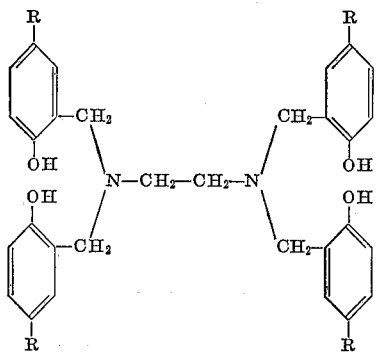

It will be readily observed that with a higher degree of hydrogen substitution in the amino groups, a greater amount of metal base must be utilized to convert the free phenolic groups to the corresponding metal salt derivatives, if such derivatives are to be utilized. The preferred metal bases are the alkaline earth metal bases.

The amino alkyl phenol or salt thereof can be simply dispersed in a lubricating grease composition in amounts of 0.2 to 6.0 wt. percent, e.g. 0.4 to 3.0 wt. percent, based on the total weight of the final composition. The grease compositions comprise lubricating oils thickened to grease consistency with an amount within the range of 5 to 40 wt. percent of metal salts of carboxylic acids. Preferred metals are the alkali and alkaline earth metals. Particularly useful grease compositions are those wherein the thickener is a mixed-salt system. Such systems are best made, for example, by neutralizing 3 to 20, preferably 5 to 15, parts by weight of a salt of a low molecular weight $C_1$ to $C_6$ fatty acid and 1 to 25, preferably 5 to 20, parts by weight of a salt of an intermediate or high molecular weight carboxylic acid per part by weight of amino alkyl phenol or metal salt thereof. Greases can be thus prepared containing about 5 to 40 wt. percent, e.g. 10 to 30 wt. percent, of the mixed salt. The above weight percents are based on the total weight of the final composition.

One such particularly preferred mixed salt thickener system comprises a lubricating oil thickened with a mixture of an alkali or alkaline earth metal salt of a dicarboxylic acid, a low molecular weight fatty acid and a high molecular weight fatty acid. Suitable low molecular weight acids include $C_2$ to $C_4$ fatty acids such as acetic and propionic acids. Acetic acid or its anhydride is preferred. Suitable high molecular weight fatty acids include naturally-occurring or synthetic, substituted or unsubstituted, saturated or unsaturated, mixed or unmixed fatty acids having about 12 to 24, e.g. 16 to 24 carbon atoms per molecule. Examples of such acids include myristic, palmitic, stearic, 12-hydroxy stearic, arachidic, oleic, ricinoleic, hydrogenated fish oil, tallow acids, etc.

Recently, a very low price fatty acid material comprising chiefly elaidic acid with minor amounts of oleic acid (9-octadeceneoic acid), and other isomers of oleic acid, e.g. 12-octadeceneoic acid and linoleic acid, etc., has become commercially available under the general name of iso-oleic acid. This acid primarily differs from pure oleic acid in that its chief component, i.e. elaidic acid, is in the cis or syn isomeric form, rather than in the more common trans or anti form of oleic acid.

The iso-oleic acid may be 100% oleic acid in the cis form, i.e. elaidic acid. However, commercial iso-oleic acid generally constitutes mixtures of a major amount of elaidic acid with minor amounts of oleic acid (i.e. 9-octadecenecoic acid) and other related acids such as 12-octadeceneoic, linoleic, linolic, stearic, palmitic, etc.

An iso-oleic acid, available from Emery Industries, under the name Emery 636 fatty acid, was used in the working examples of the invention. This acid had the following typical characteristics:

| | |
|---|---:|
| Titer,[1] ° C. | 32 |
| Iodine value (Wijs) | 70 |
| Free fatty acids (percent as oleic) | 91 |
| Acid value | 182 |
| Saponification value [2] | 8 |
| Color, Gardner | 8 |

[1] The titer noted above is a false titer, since in derivatives, the acid acts as a lower titered acid.
[2] Contains an inter-ester easily broken by saponification techniques.

The dicarboxylic acid of these compositions includes aliphatic acid of 10 to 16, preferably 10 to 12 carbon atoms, which can be either straight or branched chain. Examples of such acids include sebacic and dodecanedioic acids. Higher aliphatic dicarboxylic acids, e.g. a $C_{19}$ Koch acid, appear to result in greases of shorter lubrication life at elevated temperatures and therefore are not preferred for this invention.

The metal component of the above mixed thickener systems is preferably an alkali metal, e.g. sodium and/or lithium.

In conjunction with the use of the above mixed-salt systems it has been found preferable to incorporate alkali metal phosphates, e.g. trisodium phosphate, into the grease composition in order to impart antioxidation properties and to increase the lubrication life of the grease.

The above mixed-salt thickener systems will generally comprise 2 to 10, preferably 3 to 6, hydrogen equivalents of the low molecular weight $C_2$ to $C_4$ fatty acid metal salt per molar hydrogen equivalent of the dicarboxylic acid metal salt. Additionally, the systems will contain 1 to 4, preferably 1 to 3, molar hydrogen equivalents of $C_{12}$ to $C_{24}$ high molecular weight fatty acid metal salt per molar hydrogen equivalent of the dicarboxylic acid. The grease compositions will generally have a total content of said salt of 5.0 to 49.0 wt. percent, preferably 20 to 40 wt. percent, based on the weight of the grease. Additionally, the amount of the alkali metal phosphate will generally be about 0.1 to 6.0, preferably 1.0 to 5.0 wt. percent.

Various other additives may also be added to the lubricating grease compositions in amounts, for example, of about 0.1 to 10.0 wt. percent. Such other additives will include detergents; oxidation inhibitors, such as phenyl-alpha-naphthylamine; corrosion inhibitors, such as sorbitan monooleate; dyes; other grease thickeners, and the like.

The lubricating oil used in the compositions of the invention may be either a mineral lubricating oil or a synthetic lubricating oil. Synthetic lubricating oils which may be used include esters of dibasic acids (e.g. di-2-ethylhexyl sebacate), ester of glycols (e.g. $C_{13}$ oxo acid diester of tetraethylene glycol), complex esters (e.g. the complex ester formed by reacting one mole of sebacic acid with two moles of tetraethylene glycol and two moles of 2-ethyl-hexanoic acid), halocarbon oils, alkyl silicates, sulfite esters, mercaptals, formals, polyglycol type synthetic oils, etc., or mixtures of any of the above in any proportions. If the salts are formed in situ in the oil, then this in situ reaction is best carried out in a mineral oil, since many synthetic oils will tend to decompose or hydrolyze during the salt formation. However, the salts once formed, can be used in lubricants containing the synthetic oils noted above.

The lubricating grease compositions of the invention can be formed in a number of different ways. The most convenient is to co-neutralize all the carboxylic acid in at least a portion of the oil, with a suitable metal base. The neutralization of the carboxylic acid components may be done simultaneously with the neutralization of the amino alkyl phenol where it is desired to use said amino alkyl phenol as its metal salt derivative. After this neutralization, the resulting composition may then be heated to about 300 to 550° F., preferably 400 to 500° F., to dehydrate the composition.

Where it is desired to utilize the amino alkyl phenol per se, the grease compositions may be prepared as in the previous paragraph except that after neutralization of the carboxylic acid the amino alkyl phenol may be simply added to the neutralized composition prior to its final homogenization. Similarly, where the metal salt derivative of the amino alkyl phenol is desired, such salt derivative may be separately added to the grease composition after neutralization of the carboxylic acid ingredients is completed rather than the simultaneous co-neutralization described above.

In summary, the present invention is concerned with lubricating grease compositions which have been thickened to grease consistency with a suitable carboxylic acid metal salt and which additionally contain an amino alkyl phenol or metal salt derivative thereof. In its more specific aspects, the invention is concerned with the use of these amino alkyl phenols or salts thereof in conjunction with a specific three-component mixed-salt thickener system, namely the mixed-salts of a dicarboxylic acid, a low molecular weight fatty acid and a high molecular weight fatty acid, as hereinbefore described.

The invention will be further understood by reference to the following examples, which include preferred embodiments of the invention.

EXAMPLE 1

(All parts by weight)

*Part A.—Preparation of amino nonyl phenol*

30.3 parts (0.12 mole) of commercial nonyl phenol was dissolved in a mineral lubricating oil having a viscosity of 150 SSU at 100° F. 3.6 parts (0.06 mol) of ethylene diamine (98% purity) was then rapidly added to the oil solution and the resulting mixture was heated to about 180° F. with stirring. 3.8 parts (0.12 mole) of paraformaldehyde (95% purity) was then gradually added over a period of about one hour while still maintaining a temperature within the range of about 190° to 200° F. Following this, the reaction mixture was then aged at a temperature within said temperature range for a period of about 3 hours. The reaction mixture was dehydrated by heating to a temperature of about 320° F. and sparged with dry nitrogen gas. The finished material was a 40 wt. percent solution of amino nonyl phenol in 60 wt. percent of oil of 150 SSU viscosity at 100° F.

The nonyl phenol used above was a commercial product consisting of about 75 wt. percent mono-nonyl phenol and about 25 wt. percent of a mixture which was predominantly di-nonyl phenol with a small amount of phenol. The nonyl groups were derived from tri-isopropylene.

*Part B.—Preparation of grease composition*

54.0 parts of mineral lubricating oil of 55 SUS viscosity at 210° F., 15 parts of isooleic acid (Emery 636 fatty acid) and 4 parts of sebacic acid were charged to a fire-heated grease kettle and intimately mixed. This mixture was warmed to 120° F. 10 parts of glacial acetic acid was then added to the kettle, followed immediately by the addition of 11.5 parts of sodium hydroxide (100%) in the form of an aqueous solution consisting of 40 wt. percent of sodium hydroxide and 60 wt. percent water, together with 3 parts of trisodium orthophosphate. Heating was then initiated and the temperature of the reaction mass was raised over a period of about 2 hours to 425° F. which was maintained for about ¼ hour. The grease was then cooled, while mixing, to 250° F., where 2.5 parts of the amino nonyl phenol product of Part A (40 wt. percent solution) was added. After this, the grease was further cooled to 100° F. and was passed through a Morehouse mill thereby forming a uniform smooth structure. This grease was labeled "Grease A."

*Part C.—Comparison grease*

This grease was prepared in the same general manner as the grease of Part B except that 55.5 parts of the same mineral lubricating oil was used instead of 54.0 parts and 1.0 part of phenyl-alpha-naphthylamine was used in place of the amino nonyl phenol. This comparison grease was labeled "Comparison Grease B."

*Part D*

A grease was prepared in the same general manner as the grease of Part C except that a portion of the phenyl-alpha-naphthylamine was replaced by amino nonyl phenol. In this grease, 1.0 part of amino nonyl phenol, 0.25 part of phenyl-alpha-naphthylamine, and 55.25 parts of the mineral lubricating oil were utilized. The remainder of the ingredients were identical to the grease of Part C. This grease was labeled "Grease C."

EXAMPLE 2

Greases A and C of Example 1 and Comparison Grease B were subjected to a number of standard tests as well as ball bearing and roller bearing heat rise tests. In the ball bearing heat rise test, a 204 mm. steel ball bearing is packed with 3.0 grams of the grease to be tested and the bearing is then operated at 10,000 r.p.m. while the maximum temperature of the grease in the bearing is measured by thermocouples placed on the outer bearing race. The roller bearing heat rise test is performed similarly.

A double row cylindrical self-aligning roller bearing is packed with 200 grams of each grease (separate tests) and then operated at 2500 r.p.m. until a steady state condition occurs.

The formulations of the grease compositions of Example 1, their physical properties, and the results of the various tests are summarized in the following table.

TABLE

| Formulation (Parts by Weight) | Grease A | Comparison Grease B | Grease C |
|---|---|---|---|
| Glacial Acetic Acid | 10.0 | 10.0 | 10.0. |
| Iso-oleic Acid | 15.0 | 15.0 | 15.0. |
| Sebacic Acid | 4.0 | 4.0 | 4.0. |
| Sodium Hydroxide [1] | 11.5 | 11.5 | 11.5. |
| Sodium Phosphate | 3.0 | 3.0 | 3.0. |
| Amino nonyl phenol [2] | 2.5 | | 1.0. |
| Phenyl-alpha-naphthylamine | | 1.0 | 0.25. |
| Mineral Lubricating Oil, 55 SUS at 210° F. | 54.0 | 55.5 | 55.25. |
| Properties: | | | |
| Appearance | Excellent, Smooth Grease. | Excellent, Smooth Grease. | Excellent, Smooth Grease. |
| Dropping Point, ° F. | 500+ | 500+ | 500+. |
| ASTM Penetration, 77° F., mm./10— | | | |
| Unworked | 309 | 176 | 280. |
| Worked 60 strokes | 310 | 183 | 290. |
| Worked 10,000 strokes | 310 | 200 | 292. |
| Wheel Bearing Test (220° F.) | Pass, no slump, no leakage. | Pass, no slump, no leakage. | Pass, no slump, no leakage. |
| Ball Bearing Lubrication Life, 10,000 r.p.m. @ 300° F.[3] | 1,200 | 2,000+ | 2,000+. |
| Ball Bearing Heat Rise, Maximum Temperature. | 175 | 110 | |
| Roller Bearing Heat Rise, Maximum Temperature. | 150 | 200 | |

[1] 40% aqueous solution.
[2] 40% active ingredient in oil.
[3] ABEC-NLG1 Spindle Test.

As shown in the above table, both greases of the invention, i.e. Grease A and Grease C, were excellent, smooth greases with high dropping points. Grease A, containing the amino nonyl phenol, was considerably softer than Comparison Grease B, as indicated by the penetration values. Additionally, Grease A is seen to be highly stable to working, indicating no change in penetration after 10,000 strokes. Comparison Grease B, on the other hand, which contained phenyl-alpha-naphthylamine and did not contain amino nonyl phenol, was a harder grease which became progressively softer with working. The difference between Grease A and Comparison Grease B is clearly indicated in the results of the ball bearing and roller bearing tests. The ball bearing lubrication life of Grease A was somewhat less than Comparison Grease B. Also, the ball bearing heat rise was greater for Grease A than for Comparison Grease B. These results indicate that Grease A is a soft, non-channeling grease, whereas Comparison Grease B is a hard, channeling grease, since a non-channeling grease will tend to be churned by the ball bearings instead of being thrown to the side, thereby accounting for the greater heat rise. However, as previously indicated, a non-channeling grease is needed for roller bearing lubrication. This is particularly indicated by the roller bearing heat rise, which for Grease A was considerably less than for Comparison Grease B. Thus, because a channeling grease, such as Comparison Grease B, results in a starvation of the roller bearings, excessive friction creates a greater heat rise than is experienced with a non-channeling grease, such as Grease A. The beneficial effect of the amino nonyl phenol is therefore apparent since its inclusion in Grease A, which grease is identical to Comparison Grease B except for the amino nonyl phenol in place of the phenyl-alpha-naphthylamine, resulted in the production of a soft, non-channeling grease which is desirable for roller bearing lubrication. It is seen, therefore, that the amino nonyl phenol serves as a valuable plasticizer for grease.

While the ball bearing lubrication life of Grease A was somewhat less than Comparison Grease B, this result is not felt to be significant since the results of the roller bearing test showed Grease A to be superior to Comparison Grease B. Additionally, upon comparison of the ball bearing lubrication life of Grease C with Grease A and Comparison Grease B, it may be concluded that the amino nonyl phenol is, in addition to being a beneficial plasticizer, a valuable oxidation inhibitor as well. Thus, Grease C represented a 75% reduction in the amount of phenyl-alpha-naphthylamine used in Comparison Grease B. Thus, .75 part of the phenyl-alpha-naphthylamine was replaced with 1.0 part of the amino nonyl phenol. Surprisingly, Grease C exhibited a ball bearing lubrication life equal to Comparison Grease B, even though Grease C contained a much smaller amount of the phenyl-alpha-naphthylamine oxidation inhibitor than Comparison Grease B. It is thus evident that the amino nonyl phenol contributed to the oxidation inhibition properties of Grease C since the ball bearing lubrication life of Grease C was equal to that of Comparison Grease B.

In summary, it can be concluded from the above that an amino alkyl phenol will supply excellent plasticization to greases as well as serving as an oxidation inhibitor.

What is claimed is:

1. A lubricating grease composition comprising a major amount of lubricating oil; a minor grease thickening amount of a mixed salt combination of alkali metal salt of $C_2$ to $C_4$ monocarboxylic acid, $C_{12}$ to $C_{24}$ fatty acid and $C_{10}$ to $C_{16}$ aliphatic dicarboxylic acid, wherein the molar hydrogen equivalent ratio of said monocarboxylic acid to said dicarboxylic acid is within the range of 2:1 to 10:1 and the molar hydrogen equivalent ratio of said fatty acid to said dicarboxylic acid is within the range of 1:1 to 4:1, and about 0.4 to 3.0 wt. percent of a material selected from the group consisting of amino alkyl phenol and alkaline earth metal salts thereof, and wherein said amino alkyl phenol is the condensation reaction product of two molar portions of $C_1$ to $C_{12}$ aliphatic aldehyde, two molar portions of $C_6$ to $C_{12}$ alkyl phenol and one molar portion of polyamine of the formula $H(HN-R)_nNH_2$ wherein R is a $C_2$ to $C_6$ alkylyene radical and $n$ is 1 to 10.

2. A grease composition according to claim 1, wherein said metal is sodium metal, said monocarboxylic acid is acetic acid, said dicarboxylic acid is sebacic acid, and said fatty acid is essentially iso-oleic acid.

3. A grease composition according to claim 1, which additionally contains 0.1 to 6.0 wt. percent of alkali metal phosphate.

4. A grease composition according to claim 1, wherein said amino alkyl phenol is the condensation reaction product of formaldehyde, ethylene diamine and nonyl phenol.

5. A method of lubricating roller bearings which comprises lubricating said bearings with the grease composition of claim 1.

6. A lubricating grease composition comprising a major amount of lubricating oil thickened with about 5 to 40 wt. percent of alkali metal mixed salts wherein said mixed salts are salts of $C_2$ to $C_4$ fatty acid, $C_{12}$ to $C_{24}$ fatty acid and $C_{10}$ to $C_{16}$ aliphatic dicarboxylic acid, in a molar hydrogen equivalent ratio of said $C_2$ to $C_4$ fatty acid to said dicarboxylic acid within the range of 2:1 to 10:1 and a molar hydrogen equivalent ratio of said $C_{12}$ to $C_{24}$ fatty acid to said dicarboxylic acid of 1:1 to 4:1, and about 0.2 to 6.0 wt. percent of a material selected from the group consisting of amino alkyl phenol and alkaline earth metal salts thereof, said amino alkyl phenol being the condensation product of $C_1$ to $C_{12}$ aliphatic aldehyde, $C_5$ to $C_{25}$ alkyl phenol, and polyamine of the formula:

$$H(HN-R)_nNH_2$$

wherein R is a $C_2$ to $C_6$ alkylene radical and $n$ is 1 to 10, in a relative molar ratio of 0.5 to 2.0 moles of said aldehyde and 0.5 to 2.0 moles of said alkyl phenol for each nitrogen atom in said polyamine.

7. A lubricating grease comprising a major amount of mineral lubricating oil; about 10 to 30 wt. percent of sodium mixed salts of acetic acid, sebacic acid and isooleic acid, in a relative ratio of 3 to 6 molar equivalent proportions of acetic acid per molar equivalent proportion of sebacic acid, and 1 to 4 molar equivalent proportions of isooleic acid per molar equivalent of sebacic acid; and about 0.4 to 3.0 wt. percent of an amino alkyl phenol which is the condensation product of about 2 molar proportions of formaldehyde, about one molar proportion of ethylene diamine, and about 2.0 molar proportions of nonyl phenol.

8. A grease composition according to claim 6, wherein said amino alkyl phenol is the condensation reaction product of formaldehyde, ethylene diamine and nonyl phenol.

References Cited by the Examiner
UNITED STATES PATENTS

| | | | |
|---|---|---|---|
| 2,065,857 | 12/36 | Hilliker | 252—40.7 |
| 2,417,428 | 3/47 | McLennan | 252—39 |
| 2,417,429 | 3/47 | McLennan | 252—39 |
| 2,545,114 | 3/51 | Smith et al. | 252—40.7 |
| 2,699,428 | 1/55 | Lux et al. | 252—35 |
| 2,710,838 | 6/55 | Morway et al. | 252—41 |
| 2,846,392 | 8/58 | Morway et al. | 252—39 |
| 2,880,174 | 3/59 | Morway et al. | 252—39 |
| 2,940,930 | 6/60 | Pattenden et al. | 252—39 |
| 2,988,506 | 6/61 | Sproule et al. | 252—25 |
| 3,036,003 | 5/62 | Verdol | 252—33.4 |

DANIEL E. WYMAN, *Primary Examiner.*